United States Patent
Lindo et al.

(10) Patent No.: US 9,696,865 B2
(45) Date of Patent: Jul. 4, 2017

(54) CONTEXTUALLY RELEVANT DIGITAL COLLABORATION

(71) Applicants: Jonathan Lindo, Santa Clara, CA (US); Vamsee Lakamsani, Livermore, CA (US); Vikas Krishna, San Jose, CA (US); Nagi Prabhu, Saratoga, CA (US)

(72) Inventors: Jonathan Lindo, Santa Clara, CA (US); Vamsee Lakamsani, Livermore, CA (US); Vikas Krishna, San Jose, CA (US); Nagi Prabhu, Saratoga, CA (US)

(73) Assignee: CA, Inc., New York, NY (US)

( * ) Notice: Subject to any disclaimer, the term of this patent is extended or adjusted under 35 U.S.C. 154(b) by 372 days.

(21) Appl. No.: 14/266,245

(22) Filed: Apr. 30, 2014

(65) Prior Publication Data

US 2015/0242063 A1    Aug. 27, 2015

Related U.S. Application Data

(60) Provisional application No. 61/944,948, filed on Feb. 26, 2014.

(51) Int. Cl.
| | | |
|---|---|---|
| *G06F 3/0481* | (2013.01) | |
| *G06Q 50/00* | (2012.01) | |
| *H04L 29/08* | (2006.01) | |
| *G06Q 10/10* | (2012.01) | |

(52) U.S. Cl.
CPC ......... *G06F 3/0481* (2013.01); *G06Q 10/101* (2013.01); *G06Q 50/01* (2013.01); *H04L 67/18* (2013.01)

(58) Field of Classification Search
None
See application file for complete search history.

(56) References Cited

U.S. PATENT DOCUMENTS

| | | | | |
|---|---|---|---|---|
| 7,299,405 | B1 * | 11/2007 | Lee | G06F 17/30038 348/E7.079 |
| 8,738,634 | B1 * | 5/2014 | Roth | G06F 17/30867 707/748 |
| 8,924,465 | B1 * | 12/2014 | Tunguz-Zawislak | H04N 21/00 709/203 |
| 9,356,995 | B1 * | 5/2016 | Schaeffer, III | H04W 4/021 |
| 2004/0198398 | A1 * | 10/2004 | Amir | H04W 4/02 455/456.6 |
| 2007/0167136 | A1 * | 7/2007 | Groth | G06Q 10/109 455/41.2 |
| 2008/0140520 | A1 * | 6/2008 | Hyder | G06Q 20/342 705/14.1 |
| 2012/0246267 | A1 * | 9/2012 | Mallet | G06Q 50/01 709/217 |
| 2013/0286223 | A1 * | 10/2013 | Latta | H04N 1/00347 348/207.1 |
| 2014/0067901 | A1 * | 3/2014 | Shaw | G06Q 10/10 709/201 |

(Continued)

*Primary Examiner* — Mahelet Shiberou
(74) *Attorney, Agent, or Firm* — Baker Botts L.L.P.

(57) ABSTRACT

A method may include receiving, via a content sharing module, a request to find a content sharing collaborator. The method may include receiving context information of the request. The method may also include locating a plurality of potential collaborators based on the context information of the request, and then presenting context relevant to the potential collaborators.

18 Claims, 5 Drawing Sheets

(56) References Cited

U.S. PATENT DOCUMENTS

2014/0086510 A1* 3/2014 Couillard ........... G06K 9/00677
  382/305
2014/0101251 A1* 4/2014 Savage .............. H04L 12/1822
  709/204
2015/0032813 A1* 1/2015 Doshi .................. H04L 65/403
  709/204
2015/0200981 A1* 7/2015 Garrick ................. H04L 43/10
  709/204

* cited by examiner

CONTEXTUALLY RELEVANT DIGITAL COLLABORATION

CROSS-REFERENCE TO RELATED APPLICATION

This application claims the benefit of U.S. Provisional Application No. 61/944,948, filed Feb. 26, 2014, the disclosure of which is incorporated herein by reference.

BACKGROUND

The disclosure relates generally to collaboration tools, and more specifically, to a system and method for providing contextually relevant digital collaboration by location and/or email relationships.

SUMMARY

According to one embodiment of the disclosure, a method may include receiving, via a content sharing module, a request to find a content sharing collaborator. The method may include receiving context information of the request. The method may also include locating a plurality of potential collaborators based on the context information of the request, and then presenting context relevant to the potential collaborators.

Other features and advantages of the present disclosure are apparent to persons of ordinary skill in the art in view of the following detailed description of the disclosure and the accompanying drawings.

BRIEF DESCRIPTION OF THE DRAWINGS

For a more complete understanding of the configurations of the present disclosure, needs satisfied thereby, and the features and advantages thereof, reference now is made to the following description taken in connection with the accompanying drawings.

DETAILED DESCRIPTION

Figure 1:
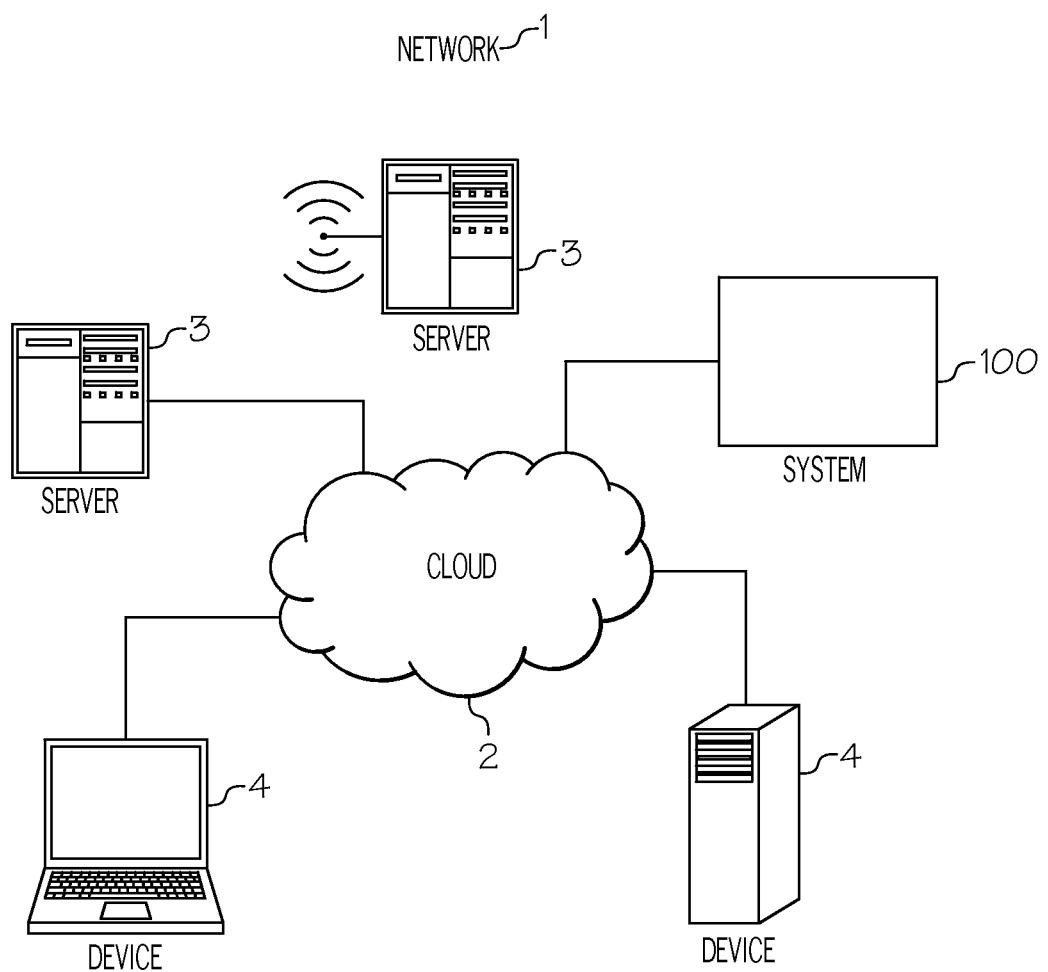
FIG. 1 illustrates a block diagram of a network for a user to access a collaborator recommendation module, in accordance with a particular embodiment of the present disclosure.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory ("RAM"), a read-only memory ("ROM"), an erasable programmable read-only memory ("EPROM" or Flash memory), an appropriate optical fiber with a repeater, a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language, such as JAVA®, SCALA®, SMALLTALK®, EIFFEL®, JADE®, EMERALD®, C++, C#, VB.NET, PYTHON® or the like, conventional procedural programming languages, such as the "C" programming language, VISUAL BASIC®, FORTRAN® 2003, Perl, COBOL 2002, PHP, ABAP®, dynamic programming languages such as PYTHON®, RUBY® and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to aspects of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

While certain example systems and methods disclosed herein may be described with reference to mainframes in cloud computing, systems and methods disclosed herein may be related to architecture and information technology ("IT") service and asset management in cloud computing, as well as usability and user experience in middleware and common services. Systems and methods disclosed herein may be applicable to a broad range of applications that monitor various parameters associated with various disciplines, such as, for example, IT systems and other activities of importance to the user.

Referring now to FIG. 1, a network 1 allows a user to access and use a content sharing module for cloud-based services. The cloud-based services may be internally provided or sourced through third parties. Network 1 may comprise one or more clouds 2, which may be public clouds, private clouds, or community clouds. Each cloud 2 may permit the exchange of information and services among users that are connected to such clouds 2. In certain configurations, cloud 2 may be a wide area network, such as the Internet. In some configurations, cloud 2 may be a local area network, such as an intranet. Further, cloud 2 may be a closed, private network in certain configurations, and cloud 2 may be an open network in other configurations. Cloud 2 may facilitate wired or wireless communications of information among users that are connected to could 2.

Network 1 may comprise one or more servers 3 and other devices operated by service providers and users. Network 1 also may comprise one or more devices 4 utilized by users. Service providers and users may provide information to each other utilizing the one or more servers 3, which connect to the one or more devices 4 via cloud 2. Servers 3 may comprise, for example, one or more of general purpose computing devices, specialized computing devices, mainframe devices, wired devices, wireless devices, monitoring devices, infrastructure devices, and other devices configured to provide information to service providers and users. Devices 4 may comprise, for example, one or more of general purpose computing devices, specialized computing devices, mobile devices, wired devices, wireless devices, passive devices, routers, switches, mainframe devices, monitoring devices, infrastructure devices, and other devices utilized by service providers and users. Example items may include network 1, cloud 2, servers 3, and devices 4.

Moreover, network 1 may comprise one or more systems 100 that may provide a content sharing module. System 100 may be, for example, one or more of a general purpose computing device, a specialized computing device, a wired device, a wireless device, a mainframe device, an infrastructure device, a monitoring device, and any other device configured to provide a service reservation module. System 100 may also be configured to collect data from one or more data sources (e.g., servers, sensors, networks, interfaces, other devices). System 100 may collect information from network 1, cloud 2, servers 3, devices 4, and other devices connected to cloud 2. System 100 may connect to cloud 2 and monitor network 1, cloud 2, servers 3, devices 4, and other devices connected to cloud 2 for available information. The available information may be user information, document content information, categories of skills information, and other information provided by service providers and users. By collecting the available information from network 1, cloud 2, servers 3, devices 4, and other devices connected to cloud 2, system 100 may perform one or more tasks associated with using the content sharing module, which is discussed in more detail below. In some configurations, one or more of servers 3 and devices 4 may comprise system 100. In other configurations, system 100 may be separate from servers 3 and devices 4.

Figure 2:
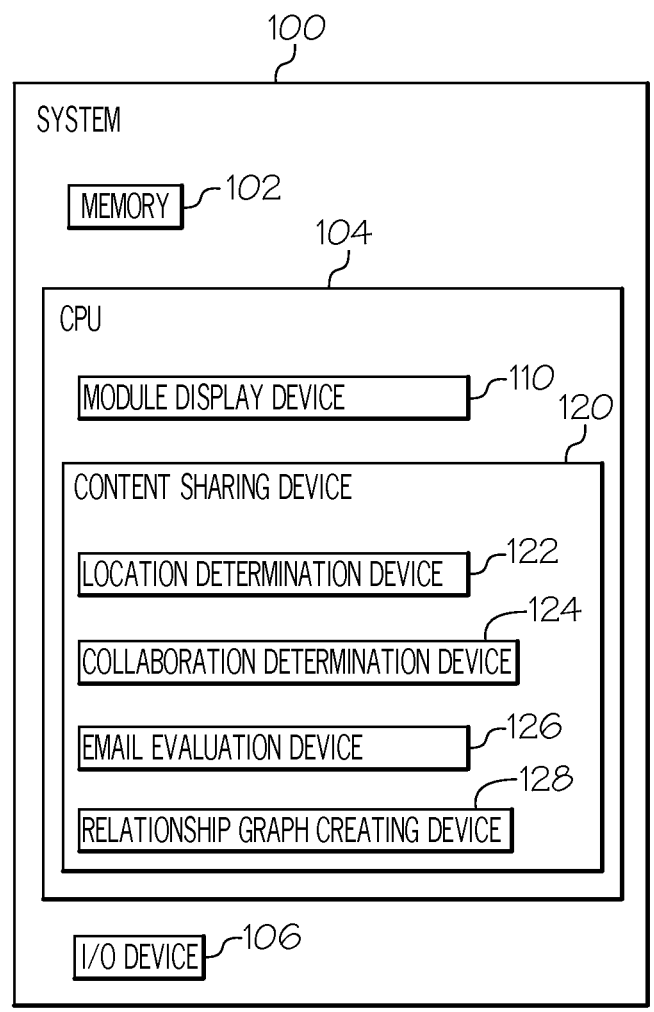
FIG. 2 illustrates a block diagram of a system for providing contextually relevant content, in accordance with a particular embodiment of the present disclosure.

Referring now to FIG. 2, system 100, which provides a content sharing module, is now described. System 100 may reside on one or more networks 1. System 100 may comprise a memory 102, a central processing unit ("CPU") 104, and an input and output ("I/O") device 106.

Memory 102 may store computer-readable instructions that may instruct system 100 to perform certain processes. As discussed above, memory 102 may comprise, for example, RAM, ROM, EPROM, Flash memory, or any suitable combination thereof. In particular, when executed by CPU 104, the computer-readable instructions stored in memory 102 may instruct CPU 104 to operate as one or more devices.

CPU 104 may operate as one or more of a module display device 110 and a content sharing device 120. Content sharing device 120 may comprise a location determination device 122, a collaboration determination device 124, an email evaluation device 126, and a relationship graph creating device 128.

I/O device 106 may receive data from networks 1, data from other devices connected to system 100, and/or input from a user and provide such information to CPU 104. I/O device 106 may transmit data to networks 1, may transmit data to other devices connected to system 100, and may transmit information to a user (e.g., display the information via a display device). Further, I/O device 106 may implement one or more of wireless and wired communication between system 100 and other devices.

The advent of the digital age has made the production of content must simpler. This, however, has inevitably led to exponential growth in the volume of documents and content that knowledge workers deal with on a daily basis in order to be productive, and result in challenges with organizing and locating content and documents relevant to the daily tasks required of knowledge workers. Thus, the process of locating and ensuring the correct and latest version of any piece of content is accessed may become onerous and time consuming, resulting in significant inefficiencies and non-productive time spent looking for these documents.

The teachings of the present disclosure may provide a content sharing module that uses available information, both environmental and digital, to address these challenges in order to effectively unlock worker productivity. In particular, the teachings of this disclosure enable the determination of whether multiple users are within the same geographic vicinity, and the option to view content related to the users when it is determined that multiple users within the same geographic vicinity are collaborating on a project, document, or other data. Documents may include word processing generated documents, web pages, pdfs, emails, database/store records, software code management or revision stores, wiki entries, stored photograph images and any other types of electronic data that a user would like to store in order to view or otherwise access in the future. In addition, the teachings of this disclosure enable the content grouping via email relationship. For example, email is a primary driver of interactions between users and colleagues within an organization. Thus, relationships can be discovered and evaluated based on email exchanges. Specifically, by scanning email sent and received, relationships between users can be determined and ranked based on frequency of email contact, e.g., to form a user's email relationship group. Thus, a content sharing module can highlight and proactively present content owned by or collaborated with members of the user's email relationship group. In addition, when the content sharing module determines that potential collaborators within the user's email relationship group are within close geographic vicinity of the user, the module can actively present relevant content that may be the work product of the user's collaboration with the potential collaborators.

Figure 3:
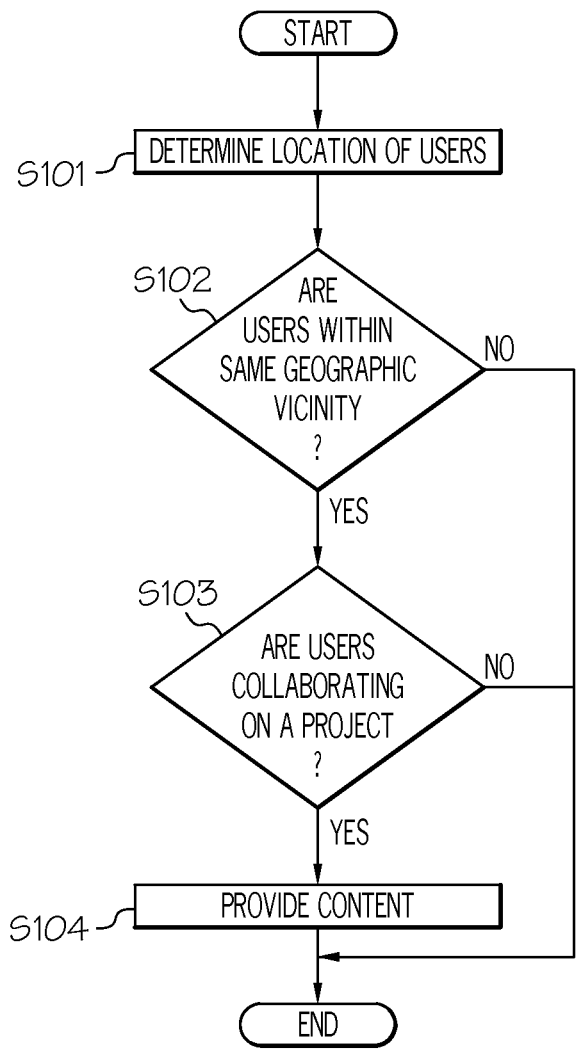
FIG. 3 illustrates a flow chart of a method for collaboration by location, in accordance with a particular embodiment of the present disclosure.
Figure 4:
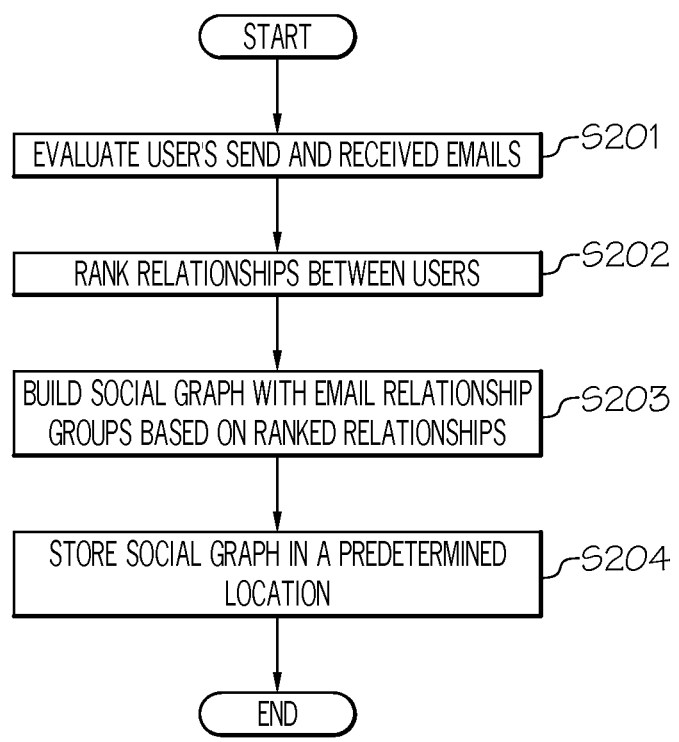
FIG. 4 illustrates a flow chart of a method for building a social graph with email relationship groups, in accordance with a particular embodiment of the present disclosure.
Figure 5:
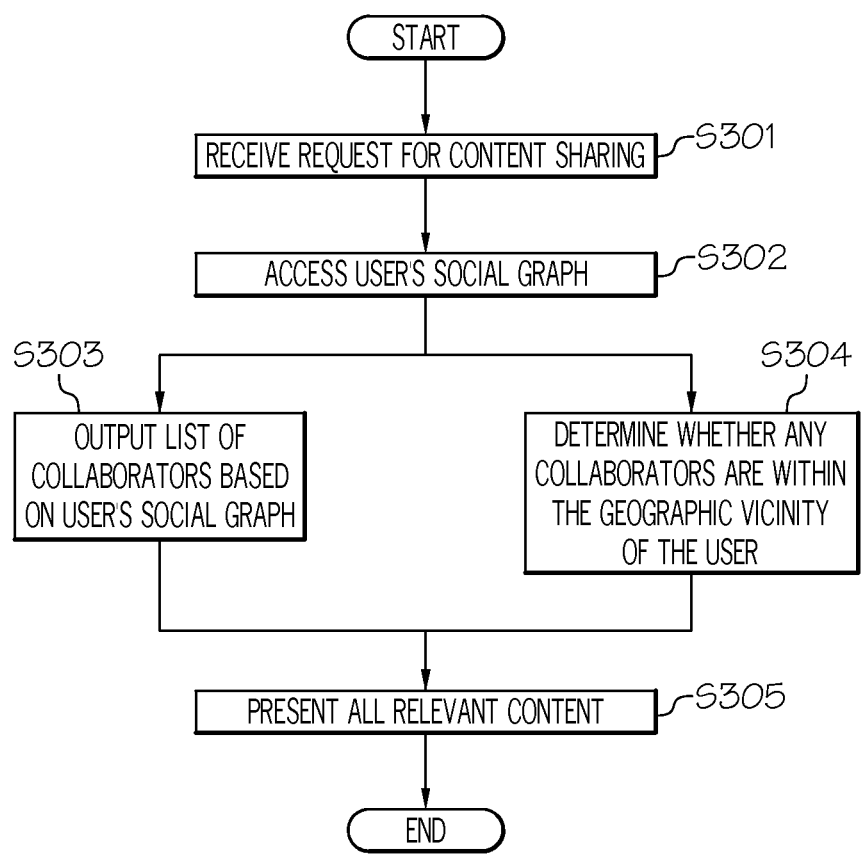
FIG. 5 illustrates a flow chart of a method for collaboration via email relationships, in accordance with a particular embodiment of the present disclosure.

Referring now to FIGS. 3, 4, and 5, processes performed by system 100 are now described.

FIG. 3 illustrates a method of collaboration between multiple users using location information. In S101, content sharing device 120, operating as a location determination device 122, may determine the location of the users. In particular, location determination device 122 may determine the geographic location of a user through the use of mobile computer devices with a Global Positioning System (GPS), low-power Bluetooth 4.0 (BTE) technology, or any other suitable location awareness capabilities and/or technology. Then, in S102, location determination device 122 may determine whether other users (i.e., potential collaborators) are within the same vicinity, as determined by a collaboration policy and based on the geographic locations of these users. For example, the collaboration policy may define "same vicinity" as users located within the same room (e.g., a conference room) and/or within the same building as potential collaborators, within a predetermined distance away from potential collaborators, or any other suitable distance/location for collaboration.

If location determination device 122 determines that other users are within the same vicinity (S102: YES), then in S103, content sharing device 120, operating as a collaboration determination device 124, may determine whether the users are collaborating together on a project, as determined by the collaboration policy. For example, the collaboration policy may determine whether users are collaborating on a project together by accessing information (e.g., stored in a memory) containing a list of users that are part of a particular project, or any other suitable method. If location determination device 122 determines that other users are not within the same vicinity (S102: NO), the process may terminate.

If collaboration determination device 124 determines that the users are collaborating together on a project (S103: YES), then in S104, content sharing device 120 locate all content relevant to the particular project that the users are collaborating on, and may provide this content to the user (e.g., via module display device 110). For example, content sharing device 120 may automatically highlight all relevant emails/attachments and all relevant documents, provide the user with a list of all relevant content or the locations of all relevant content, and/or provide the user with a list of relevant content based on user-specified or project-location-specified (e.g., most relevant content based on the progress of the project) parameters, and/or any other suitable method. In addition, content sharing device 120 may first request authorization from the user to provide this content, request authorization from the user to provide specific content based on certain, user-provided parameters, and/or any other suitable method. If collaboration determination device 124 determines that the users are not collaborating together on a project (S103: NO), then the process may terminate. In addition, after the relevant content is provided in S104, the process may terminate.

As an example of the process of FIG. 3, a meeting with certain team members is held. System 100 (e.g., via content sharing device 120) may detect that team members who are collaborating on Project X are all present and nearby using geographic-location technology from the team member's mobile devices. Then, system 100 (e.g., via content sharing device 120 and module display device 110) may automatically highlight and make available and/or display all content relevant to Project X for these team members, eliminating the need to search for the required content and/or data.

FIG. 4 illustrates a method of determining and evaluating relationships between users based on email exchanges. In S201, content sharing device 120, operating as an email evaluation device 126, may evaluate a user's sent and received emails. In particular, email evaluation device 126 may scan a user's sent and received emails to determine the relationships between users, for example, based on the frequency of email contact between a plurality of users, whether the recipient is in the "To:" field, the "Cc:" field, or the "Bcc:" field, or any other suitable parameters. Then, in S202, email evaluation device 126 may rank the relationship between the user and other users (potential collaborators) based on the frequency of email contact between the user, recipient field information, and other relevant information. For example, higher frequency of email contact, and more emails directed to another user (i.e., the recipient is more in the "To:" field and less in the "Cc:" and "Bcc:" fields) would result in higher ranking of the relationship between the user and the recipient/potential collaborator.

Then, in S203, content sharing device 120, operating as a relationship graph creating device 128, may build a social graph with email relationship groups based on the information and ranking of the user's email exchanges. For example, through analysis of the user's email exchanges, it can be determined which users are members of a person's email relationship group (e.g., a group of people that the user regularly interacts with, corresponds with, and/or collaborates with). These users (potential collaborators) can then be scored according to their email relationships, and this score information can then be used to form the social graph that categorizes network relationships between users.

Next, in S204, relationship graph creating device 128 may store the social graph with network relationship information for the user in a predetermined location (e.g., memory 102, and any other suitable location). After the social graph is stored, the process terminates.

FIG. 5 illustrates a method of collaboration via email relationships. In S301, module display device 110 may receive a request for content sharing. For example, module display device 110 may receive a request from the user or system 100 to access relevant content for content sharing. Next, in S302, content sharing device 120 finds and accesses the stored social graph with network relationship information for the user. Then, in S303, content sharing device 120 may output a list of users that may be potential collaborators based on the user's social graph. This allows the user to actively select a potential collaborator to access the relevant content shared between the user and the potential collaborator, or content owned by and/or collaborated with by the potential collaborators can be highlighted and made available proactively (S305), for example, via a content sharing application or platform. The content may comprise emails, attachment to emails, documents, and any other shared content.

In addition, or alternatively, in S304, content sharing device 120 may determine whether there are any collaborators within the vicinity of the user, for example, as discussed above with regard to FIG. 3. In particular, content sharing device 120 may locate potential collaborators within the vicinity of the user, and who are also on the user's social graph, as determined by email relationships. Then, content sharing device 120 may access and present all relevant content shared between the user and the potential collaborator determined to be located within the geographic vicinity of the user.

The block diagrams and flowcharts in FIGS. 1-5 illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method, comprising:
    receiving, via a content sharing module, a request to find a content sharing collaborator;
    determining a geographic location of a first user providing the request;
    determining whether a plurality of second users are within the geographic vicinity of the first user by determining geographic locations of the plurality of second users;
    determining whether the first user and the plurality of second users are collaborating on a project when it is determined that the plurality of second users are within a geographic vicinity of the first user;
    presenting, at a graphical user interface, content relevant to the project in response to determining that the plurality of second users are collaborating on the project and within a geographic vicinity of the first user;
    wherein presenting content relevant to the project comprises automatically highlighting and displaying the content relevant to the project to the plurality of second users using the graphical user interface, and making the content relevant to the project available to the plurality of second users; and
    wherein presenting content relevant to the project further comprises:
        requesting authorization from a particular one of the plurality of second user to share certain of the content relevant to the project available to others of the plurality of second users; and
        in response to receiving the authorization, making the certain content of the content relevant to the project available to the others of the plurality of second users.

2. The method of claim 1, wherein the geographic location is determined using a location awareness capability of a user's mobile computing device.

3. The method of claim 1, wherein presenting content relevant to the project comprises presenting:
    content that is a result of a collaboration between the user and the collaborator; or
    content that is owned by the collaborator.

4. The method of claim 1, wherein the request to find a content sharing collaborator comprises information on a social graph of email relationship groups of the first user providing the request.

5. The method of claim 4, the social graph of email relationship groups is determined by:
    evaluating the first user's sent and received emails;
    compiling a list of a plurality of second users from the evaluation of the first user's emails;
    ranking a relationship between the first user and each of the plurality of second users;

building a social graph with a plurality of email relationship groups based on the ranked relationships; and
storing the social graph in a predetermined location.

6. The method of claim 5, wherein the ranking of the relationship between the first user and each of the plurality of second users is based on:
frequency of email contact between the first user and each of the plurality of second users, and
frequency of each of a plurality of email recipient fields.

7. A system comprising:
a receiving device configured to receive, via a content sharing module,
a request to find a content sharing collaborator,
a determining device configured to:
determine a geographic location of a first user providing the request,
determine whether a plurality of second users are within the geographic vicinity of the first user by determining geographic locations of the plurality of second users, and
determine whether the first user and the plurality of second users are collaborating on a project when the determining device determines that the plurality of second users are within a geographic vicinity of the first user;
a presenting device configured to present content relevant to the project in response to determining that the plurality of second users are within a geographic vicinity of the first user;
wherein presenting content relevant to the project comprises automatically highlighting and displaying the content relevant to the project to the plurality of second users, and making the content relevant to the project available to the plurality of second users; and
wherein the presenting device is further operable to:
request authorization from a particular one of the plurality of second user to share certain of the content relevant to the project available to others of the plurality of second users; and
in response to receiving the authorization, make the certain content of the content relevant to the project available to the others of the plurality of second users.

8. The system of claim 7, wherein the geographic location is determined using a location awareness capability of a user's mobile computing device.

9. The system of claim 7, wherein the presenting device is further configured to present:
content that is a result of a collaboration between the user and the collaborator; or
content that is owned by the collaborator.

10. The system of claim 7, wherein the request to find a content sharing collaborator comprises information on a social graph of email relationship groups of the first user providing the request.

11. The system of claim 10, wherein the social graph of email relationship groups is determined by:
an evaluating device that evaluates the first user's sent and received emails;
a compiling device configured to compile a list of the plurality of second users from the evaluation of the first user's emails;
a ranking device configured to rank a relationship between the first user and each of the plurality of second users;
a building device configured to build a social graph with a plurality of email relationship groups based on the ranked relationships; and
a storing device configured to store the social graph in a predetermined location.

12. The system of claim 11, wherein the ranking of the relationship between the first user and each of the plurality of second users is based on:
frequency of email contact between the first user and each of the plurality of second users, and
frequency of each of a plurality of email recipient fields.

13. A computer program product comprising:
a non-transitory computer-readable storage medium having computer-readable program code embodied therewith, the computer-readable program code comprising:
computer readable program code configured to receive, via a content sharing module, a request to find a content sharing collaborator;
computer readable program code configured to determine a geographic location of a first user providing the request,
computer readable program code configured to determine whether a plurality of second users are within the geographic vicinity of the first user by determining geographic locations of the plurality of second users, and
computer readable program code configured to determine whether the first user and the plurality of second users are collaborating on a project when it is determined that the plurality of second users are within a geographic vicinity of the first user;
computer readable program code configured to present content relevant to the project in response to determining that the plurality of second users are within a geographic vicinity of the first user;
wherein presenting content relevant to the project comprises automatically highlighting and displaying the content relevant to the project to the plurality of second users, and making the content relevant to the project available to the plurality of second users; and
computer readable program code configured to request authorization from a particular one of the plurality of second user to share certain of the content relevant to the project available to others of the plurality of second users, and in response to receiving the authorization, make the certain content of the content relevant to the project available to the others of the plurality of second users.

14. A computer program product comprising:
a non-transitory computer-readable storage medium having computer-readable program code embodied therewith, the computer-readable program code comprising:
computer readable program code configured to receive, via a content sharing module,
a request to find a content sharing collaborator, and context information of the request;
computer readable program code configured to locate a plurality of potential collaborators based on the context information of the request;
computer readable program code configured to present content relevant to the potential collaborators;
wherein the context information of the request is determined by:
computer readable program code configured to:
determine a geographic location of a first user providing the request, determine whether a plurality of second users are within the geographic vicinity of the first user by determining geographic locations of the plurality of second users, and determine whether the first user and the plurality of second users are collaborating on a project when it is determined that the plurality of second users are within a geographic vicinity of the first user; and computer readable program code configured to present content relevant to the project of the first user and the plurality of second users when it is determined that the plurality of second users are within a geographic vicinity of the first user;

wherein presenting content relevant to the project comprises automatically highlighting and displaying the content relevant to the project to the plurality of second users, and making the content relevant to the project available to the plurality of second users; and computer readable program code configured to request authorization from a particular one of the plurality of second user to share certain of the content relevant to the project available to others of the plurality of second users, and in response to receiving the authorization, make the certain content of the content relevant to the project available to the others of the plurality of second users.

15. The computer program product of claim 14, wherein the geographic location is determined using a location awareness capability of a user's mobile computing device.

16. The computer program product of claim 14, wherein the computer readable program code is further configured to present:

content that is a result of a collaboration between the user and the collaborator; or content that is owned by the collaborator.

17. The computer program product of claim 14, wherein the context information of the request comprises information on a social graph of email relationship groups of a first user providing the request.

18. The computer program product of claim 17, wherein the social graph of email relationship groups is determined by:

computer readable program code configured to evaluate the first user's sent and received emails;

computer readable program code configured to compile a list of the plurality of second users from the evaluation of the first user's emails;

computer readable program code configured to rank a relationship between the first user and each of the plurality of second users;

computer readable program code configured to build a social graph with a plurality of email relationship groups based on the ranked relationships; and computer readable program code configured to store the social graph in a predetermined location.

* * * * *